(12) United States Patent
Taylor

(10) Patent No.: US 12,521,064 B2
(45) Date of Patent: Jan. 13, 2026

(54) COLLATERAL VENTILATION ASSESSMENT SYSTEM

(71) Applicant: GYRUS ACMI, INC., Westborough, MA (US)

(72) Inventor: Paul W. Taylor, Redmond, WA (US)

(73) Assignee: Gyrus ACMI, Inc., Westborough, MA (US)

(*) Notice: Subject to any disclaimer, the term of this patent is extended or adjusted under 35 U.S.C. 154(b) by 1458 days.

(21) Appl. No.: 16/874,491

(22) Filed: May 14, 2020

(65) Prior Publication Data
US 2020/0359966 A1 Nov. 19, 2020

Related U.S. Application Data

(60) Provisional application No. 62/906,542, filed on Sep. 26, 2019, provisional application No. 62/906,571, (Continued)

(51) Int. Cl.
*A61B 5/00* (2006.01)
*A61B 5/08* (2006.01)
(Continued)

(52) U.S. Cl.
CPC .......... *A61B 5/6853* (2013.01); *A61B 5/0803* (2013.01); *A61B 5/087* (2013.01);
(Continued)

(58) Field of Classification Search
CPC ....... A61B 5/6853; A61B 5/087; A61B 5/097; A61B 5/0803; A61B 5/0871; A61B 5/742;
(Continued)

(56) References Cited

U.S. PATENT DOCUMENTS 5,964,712 A * 10/1999 Kubo ................. G01N 21/3504
73/23.3
10,702,166 B1 7/2020 Freeman et al.
(Continued)

FOREIGN PATENT DOCUMENTS

CN 111938651 A 11/2020
DE 102020112504 A1 11/2020
(Continued)

OTHER PUBLICATIONS

Oct. 22, 2021 Search Report issued in International Application No. FR2004795.
(Continued)

*Primary Examiner* — Alex M Valvis
*Assistant Examiner* — Jonathan M Haney
(74) *Attorney, Agent, or Firm* — Schwegman Lundberg & Woessner, P.A.

(57) ABSTRACT

Disclosed embodiments include apparatuses, systems, and methods for assessing collateral ventilation. An illustrative embodiment includes an occlusion device insertable into a bronchial passageway to selectively seal the bronchial passageway to occlude a lobe of a lung. A flow lumen sealably extends through the occlusion device to a distal end and has a proximal end receptive of a positive pressure flow. A check valve is coupleable with the flow lumen to permit the positive pressure flow to pass to the distal end of the flow lumen and prevent a backflow of pressure from the flow lumen. A flow meter is coupleable with the flow lumen to measure the positive pressure flow through the flow lumen. The occlusion device is insertable into the passageway to the isolated lobe. Measurements of the flow meter of the positive pressure flow into the occluded lobe are monitorable to assess collateral ventilation from the occluded lobe.

20 Claims, 15 Drawing Sheets

Related U.S. Application Data filed on Sep. 26, 2019, provisional application No. 62/849,652, filed on May 17, 2019.

(51) Int. Cl.

| | | |
|---|---|---|
| *A61B 5/087* | (2006.01) | |
| *A61B 5/097* | (2006.01) | |
| *A61M 16/00* | (2006.01) | |
| *A61M 16/04* | (2006.01) | |
| *A61M 16/20* | (2006.01) | |

(52) U.S. Cl.
CPC ............ *A61B 5/0871* (2013.01); *A61B 5/097* (2013.01); *A61B 5/742* (2013.01); *A61B 5/7435* (2013.01); *A61M 16/0051* (2013.01); *A61M 16/024* (2017.08); *A61M 16/0404* (2014.02); *A61M 16/0434* (2013.01); *A61M 16/208* (2013.01); *A61M 2016/0033* (2013.01); *A61M 2205/505* (2013.01); *A61M 2205/583* (2013.01); *A61M 2205/70* (2013.01); *A61M 2210/1035* (2013.01); *A61M 2230/40* (2013.01)

(58) Field of Classification Search
CPC ............ A61B 5/7435; A61M 16/0404; A61M 16/024; A61M 16/0051; A61M 16/0434; A61M 16/208; A61M 2016/033; A61M 2205/505; A61M 2205/583; A61M 2205/70; A61M 2210/1035; A61M 2230/40

See application file for complete search history.

(56) References Cited

U.S. PATENT DOCUMENTS

| | | | |
|---|---|---|---|
| 10,758,239 | B2 | 9/2020 | Aljuri et al. |
| 11,491,297 | B2* | 11/2022 | Harrington .......... A61M 11/042 |
| 2002/0185126 | A1* | 12/2002 | Krebs ................... A61M 16/12 |
| | | | 128/200.24 |
| 2004/0231673 | A1 | 11/2004 | Reissmann |
| 2008/0053446 | A1* | 3/2008 | Sleeper ................ A61M 16/06 |
| | | | 128/205.25 |
| 2011/0087122 | A1* | 4/2011 | Aljuri .................... A61B 5/08 |
| | | | 128/200.24 |
| 2012/0149995 | A1 | 6/2012 | Mantri et al. |
| 2013/0291869 | A1 | 11/2013 | Daly |
| 2013/0303930 | A1 | 11/2013 | Elefteriades et al. |
| 2020/0187828 | A1* | 6/2020 | Wheeler ............ G01N 33/0011 |
| 2020/0245900 | A1 | 8/2020 | Douglas et al. |
| 2020/0360633 | A1 | 11/2020 | Taylor |
| 2022/0175263 | A1 | 6/2022 | Erramilli et al. |

FOREIGN PATENT DOCUMENTS

| | | |
|---|---|---|
| EP | 0778035 A1 | 6/1997 |
| FR | 3098103 A1 | 1/2021 |
| JP | 2020189090 A | 11/2020 |

OTHER PUBLICATIONS

"U.S. Appl. No. 16/874,511, Non Final Office Action mailed Dec. 22, 2022", 12 pgs.
"France Application Serial No. 2004795, Office Action mailed Jul. 12, 2020", with machine translation, 10 pgs.
"France Application Serial No. 2004795, Preliminary Search Report mailed Nov. 4, 2021", with machine translation, 14 pgs.
"France Application Serial No. 2004795, Response filed Feb. 2, 2022 to Preliminary Search Report mailed Nov. 4, 2021", with machine translation, 8 pgs.
"France Application Serial No. 2004795, Response filed Mar. 2, 2021 to Office Action mailed Jul. 12, 2020", with machine translation, 4 pgs.
"United Kingdom Application Serial No. 2007242.7, Examination Report mailed Apr. 26, 2022", 5 pgs.
"United Kingdom Application Serial No. 2007242.7, Response filed Jun. 22, 2022 to Examination Report mailed Apr. 26, 2022", 53 pgs.
"United Kingdom Application Serial No. 2007242.7, Response filed Aug. 9, 2022 to Subsequent Examination Report under Section 18 (3) mailed Aug. 5, 2022", 5 pgs.
"United Kingdom Application Serial No. 2007242.7, Subsequent Examination Report under Section 18 (3) mailed Aug. 5, 2022", 2 pgs.

\* cited by examiner

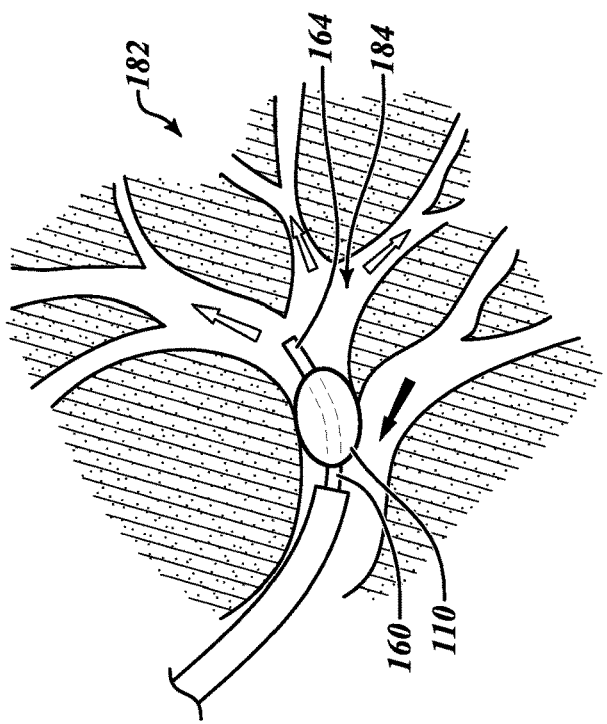
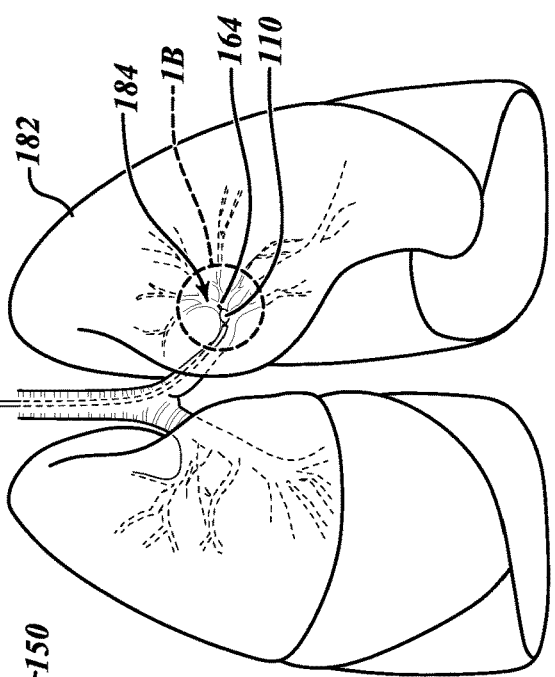
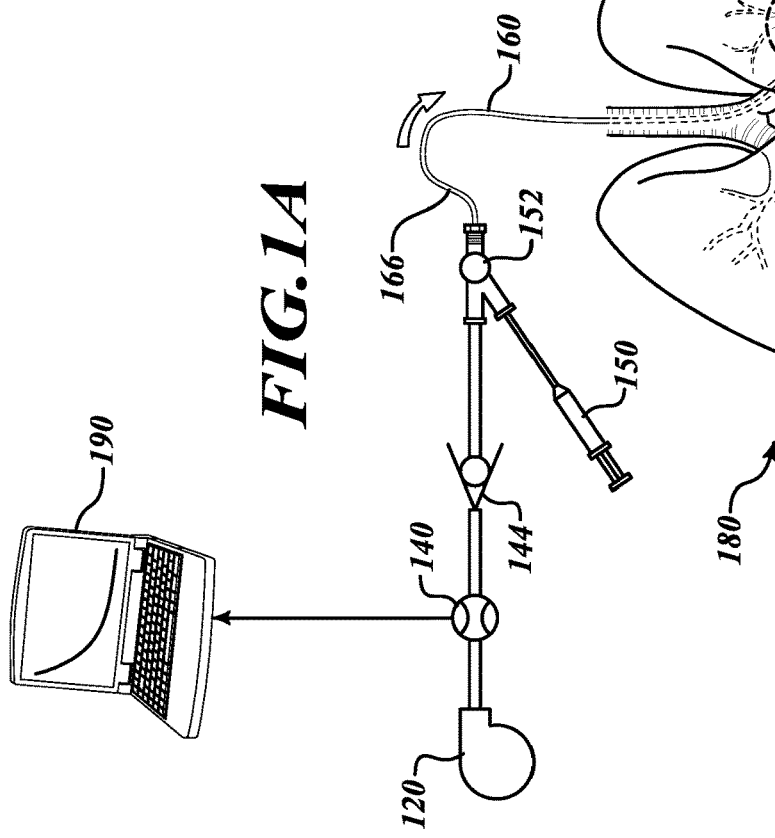
FIG. 1A
FIG. 1B

COLLATERAL VENTILATION ASSESSMENT SYSTEM

PRIORITY CLAIM

The present application claims the priority and benefit of U.S. Provisional Patent Application Ser. No. 62/849,652 filed May 17, 2019 and entitled "COLLATERAL VENTILATION ASSESSMENT SYSTEM"; U.S. Provisional Patent Application Ser. No. 62/906,542 filed Sep. 26, 2019 and entitled "COLLATERAL VENTILATION ASSESSMENT SYSTEM"; and U.S. Provisional Patent Application Ser. No. 62/906,571 filed Sep. 26, 2019 and entitled "COLLATERAL VENTILATION ASSESSMENT DISPLAY SYSTEM."

FIELD

The present disclosure relates to apparatuses, systems, and methods for testing one or more lobes of a patient's lungs for collateral ventilation.

BACKGROUND

The statements in this section merely provide background information related to the present disclosure and may not constitute prior art.

A number of respiratory ailments, such as emphysema, may result in a patient not being able to effectively exhale air from one or more lobes of his or her lungs. The resulting hyperinflation of the lungs may prevent the patient from being able to draw sufficient oxygen and, thus, may greatly affect the patient's health. Treatments, such as implantation of a one-way endobronchial valve in a bronchial passageway to a poorly functioning lobe may block air from entering that compartment to help prevent hyperinflation of that lobe.

Such treatments may not be effective when a patent suffers from collateral ventilation, where air flows between lobes of the lungs rather than through the proper passageways into each lobe. To avoid wasteful implantation of an endobronchial valve or the use of other treatment where it will not be effective, it is important to be able to detect when collateral ventilation occurs in a patient's lungs.

SUMMARY

Disclosed embodiments include apparatuses, systems, and methods for determining whether collateral ventilation occurs in a patient's lungs.

In an illustrative embodiment, an apparatus includes an occlusion device insertable into a bronchial passageway to selectively seal the bronchial passageway to occlude a lobe of a lung to be tested. A flow lumen sealably extends through the occlusion device to a distal end and has a proximal end receptive of a positive pressure flow into the flow lumen. A check valve is pneumatically coupleable with the flow lumen to permit the positive pressure flow to pass to the distal end of the flow lumen and to prevent a backflow of pressure from the distal end of the flow lumen. A flow meter is pneumatically coupleable with the flow lumen to measure the positive pressure flow passing through the flow lumen. The occlusion device is insertable into the bronchial passageway to the occluded lobe. Measurements of the flow meter of the positive pressure flow through the flow lumen into the occluded lobe are monitorable to assess a presence of collateral ventilation from the occluded lobe.

In another illustrative embodiment, a system includes an occlusion device insertable into a bronchial passageway to selectively seal the bronchial passageway to occlude a lobe of a lung to be tested. A flow lumen sealably extends through the occlusion device to a distal end and having a proximal end receptive of a positive pressure flow into the flow lumen. A pressure source is pneumatically couplable to the proximal end of the flow lumen to provide the positive pressure flow. A check valve is pneumatically coupleable with the flow lumen to permit the positive pressure flow to pass to the distal end of the flow lumen and to prevent a backflow of pressure from the distal end of the flow lumen. A flow meter is pneumatically couplable with the flow lumen to measure the positive pressure flow passing through the flow lumen. A measurement apparatus is communicatively couplable with the flow meter to monitor the positive pressure flow through the flow lumen to the occluded lobe over time to assess presence of collateral ventilation out of the occluded lobe.

In a further illustrative embodiment, a method includes occluding a bronchial passageway to occlude a lobe of a lung to be tested. A positive pressure flow of air from a continuous positive airway pressure source configured to prevent the positive pressure flow from distending the occluded lobe is introduced into the lobe downstream of the occluded bronchial passageway. The positive pressure flow of air into the occluded lobe is monitored to detect at least one characteristic chosen from a lack of collateral ventilation from the occluded lobe and a presence of collateral ventilation from the occluded lobe.

In an illustrative embodiment, a measurement apparatus includes a flow meter input communicatively coupleable with an electronic flow meter positionable to monitor a positive pressure flow into a selectively occluded lobe of a lung. A processing logic circuit is communicatively coupled with the flow meter input to process measurements of the positive pressure flow and to generate a digital representation of the positive pressure flow into the occluded lobe over time. A display device is configured to receive the digital representation and visually present the positive pressure flow into the occluded lobe over time, a continual decrease over time of the positive pressure flow into the occluded lobe indicating a lack of collateral ventilation from the lobe and a stabilization over time of the positive pressure flow into the occluded lobe indicating a presence of collateral ventilation from the lobe.

In another illustrative embodiment, a system includes an occlusion device insertable into a bronchial passageway to selectively seal the bronchial passageway to occlude a lobe of a lung to be tested. A flow lumen sealably extends through the occlusion device to a distal end and having a proximal end receptive of a positive pressure flow into the flow lumen. A pressure source is pneumatically couplable to the proximal end of the flow lumen to provide the positive pressure flow. A check valve is pneumatically coupleable with the flow lumen to permit the positive pressure flow to pass to the distal end of the flow lumen and to prevent a backflow of pressure from the distal end of the flow lumen. A flow meter is pneumatically couplable with the flow lumen to measure the positive pressure flow passing through the flow lumen into the occluded lobe. A measurement apparatus is communicatively couplable with the flow meter to monitor the positive pressure flow to the occluded lobe over time to assess presence of collateral ventilation out of the lobe. The measurement apparatus includes a processing logic circuit communicatively coupled with the flow meter input to process measurements of the positive pressure flow and to generate a digital representation of the positive pressure flow through the flow lumen into the occluded lobe over time. A display device is configured to receive the digital representation and visually present the digital representation of the positive pressure flow through the flow lumen into the occluded lobe. A continual decrease over time of the positive pressure flow through the flow lumen into the occluded lobe indicates a lack of collateral ventilation from the occluded lobe and a stabilization over time of the positive pressure flow through the flow lumen into the occluded lobe indicates a presence of collateral ventilation from the lobe.

In still another illustrative embodiment, a method includes receiving measurements from an electronic flow meter positioned to monitor a positive pressure flow into a selectively occluded lobe of a lung. The measurements of the positive pressure flow over time are processed to generate a digital representation of the positive pressure flow into the occluded lobe over time. A viewable representation of the measurements of the positive pressure flow into the occluded lobe over time is generated from which a user can discern changes in the positive pressure flow indicative of a presence of collateral ventilation from the occluded lobe.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 1A is a schematic diagram of an illustrative system for assessing collateral ventilation;

FIG. 1B is an enlarged view of a region B in FIG. 1A showing an occlusion device positioned in a bronchial passageway;

DETAILED DESCRIPTION

Figure 2A:
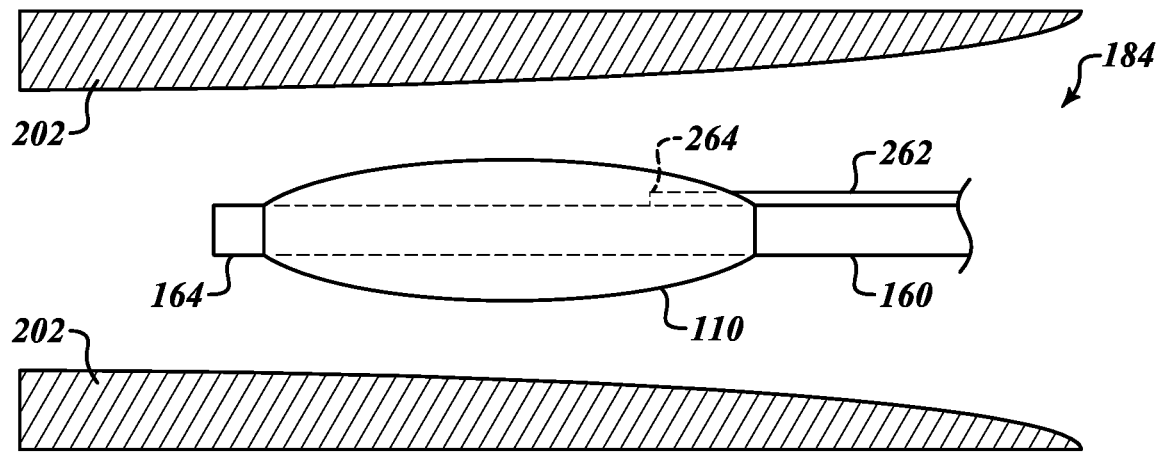
FIGS. 2A and 2B are partial cross-sectional views of an occlusion device of the system of FIGS. 1A and 1B.

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two-digits of the figure numbers, respectively, in which the element first appears.

The following description explains, by way of illustration only and not of limitation, various embodiments of systems, apparatuses, and methods for assessing collateral ventilation between lobes of a lung.

Referring to FIGS. 1A and 1B and given by way of non-limiting overview, in various embodiments an illustrative system 100 can assess collateral ventilation by testing a lobe 182 of a lung 180. The system 100 includes an occlusion device 110 insertable into a bronchial passageway 184 to the lobe 182 of the lung 180 to be tested. A flow lumen 160 sealably extends through the occlusion device 110 to a distal end 164 to convey a positive pressure flow to the lobe 182. A pressure source 120 is couplable to a proximal end 166 of the flow lumen 160 to provide the positive pressure flow to the lobe 182. A check valve 144 is positionable between the pressure source 120 and the flow lumen 160 to permit the positive pressure flow to the lobe 182 and prevent a backflow of pressure from the lobe 182 through the flow lumen 160. A flow meter 140 is couplable to the flow lumen 160 to measure the positive pressure flow to the lobe 182. A measurement apparatus 190 is couplable with the flow meter 140 to monitor changes in the positive pressure flow to the lobe 182 over time to assess a presence of collateral ventilation out of the lobe 182.

Now that an overview has been given, details will be explained by way of examples given by way of illustration only and not of limitation.

Still referring to FIGS. 1A and 1B, the system 100 includes the occlusion device 110 through which the flow lumen 160 extends into the lobe 182 to be tested. To test the lobe 182, a passageway 184 to the lobe 182 is blocked by the occlusion device 110, thereby preventing the lobe 182 from receiving air via the passageway 184. In various embodiments, the occlusion device 110 is an inflatable device that is selectively inflated or deflated via an inflation lumen (not shown in FIG. 1) that coextends with the flow lumen 160. The configuration of the occlusion device is described in further detail with regard to FIGS. 2A and 2B. The flow lumen 160 extends to and through the occlusion device 110 to the distal end 164 that extends into the lobe 182.

The system 100 further includes the pressure source 120, the flow meter 140, the check valve 144, and an inflation device 150 (to selectively inflate the occlusion device 110). In various embodiments, the flow lumen 160 (which may incorporate an inflation lumen for the occlusion device 110) is coupled downstream of the check valve 144 and the inflation device 150 at a coupling 152 (which may include a Luer lock or similar device to connect the flow lumen 160). Operation of the system 110 and assessing collateral ventilation is performed by the measurement apparatus 190, the operation of which is further described below with reference to FIGS. 3-11.

Figure 2B:
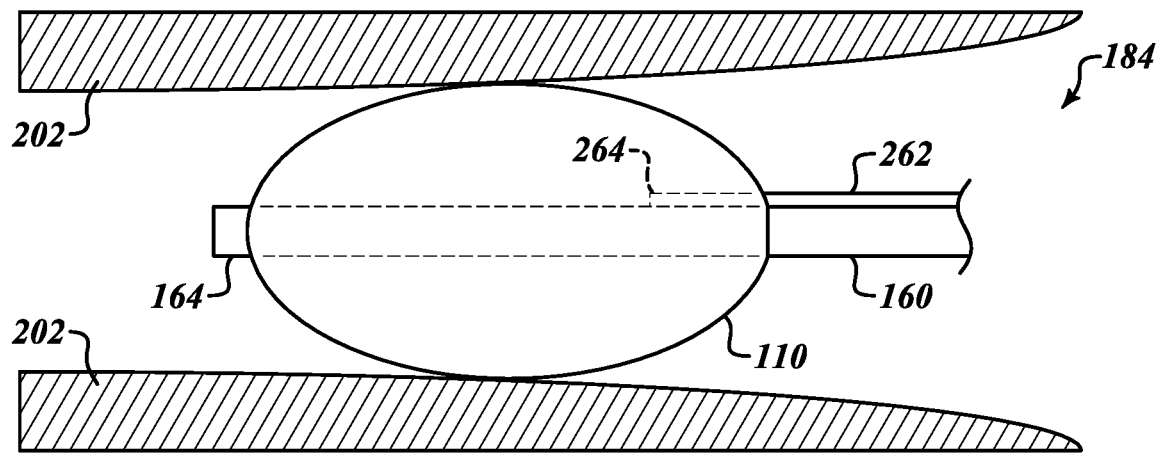

In various embodiments, the system 100 occludes the lobe 182 of the lung 180 to be tested by blocking the bronchial passageway 184 to the lobe 182 with the occlusion device 110. Referring to FIGS. 2A and 2B, the bronchial passageway 184 may be blocked by inserting the occlusion device 110 into the bronchial passageway 184 in between walls 202 of the bronchial passageway 184. As shown in FIG. 2A, the occlusion device 110 is in a deflated condition. The flow lumen 160 sealably extends through the occlusion device 110 with the distal end 164 of the flow lumen 160 extending into the bronchial passageway 184 beyond the occlusion device 110. The distal end 164 of the flow lumen 160 and the occlusion device 110 may be a balloon catheter. The flow lumen 160 coextends with and may be integrally formed with an inflation lumen 262. The inflation lumen 262 has a distal end 264 that extends into the interior of the occlusion device 110 such that an inflation gas passed through the inflation lumen 262 may inflate the occlusion device.

Briefly referring back to FIG. 1A, actuating the inflation device 150 may drive the inflation gas through the inflation lumen 162 into the occlusion device 110 to inflate it. Thus, when the inflation device 150 is a syringe, a user may depress a plunger on the syringe to drive the inflation gas through the inflation lumen 162 to inflate the occlusion device 110. Referring now to FIG. 2B, the occlusion device 110 is in an inflated condition, thereby blocking the bronchial passageway 184 and occluding the lobe 182. The occlusion device 110 presses against the opposing walls 202 of the bronchial passageway 184, thereby blocking the flow of air into the bronchial passageway 184 except for a flow of gas introduced via the flow lumen 160.

Referring back to FIG. 1A, once the occlusion device 110 is in place and the lobe 184 is thus occluded, other components of the system 100 are used to assess potential collateral ventilation out of the lobe 184. The pressure source 120 is activated to commence a flow of positive pressure via the flow lumen 160, thereby introducing a positive pressure flow into the occluded lobe 184 downstream of the occluded bronchial passageway 184. In various embodiments, the pressure source 120 may be an air pump, such as a continuous positive airway pressure (CPAP) device as commonly used by sleep apnea patients. The pressure source 120 is configured to generate a pressure that is tolerable and noninjurious even to potentially weakened or damaged lungs. In various embodiments, the positive pressure may be set to 15 centimeters of water (cm $H_2O$) or in a range of 10 to 15 cm $H_2O$ with a volumetric flow up to 500 milliliters (mL) per minute. This pressure typically may be substantially lower than that generated by ventilators and respirators used for inpatient hospital care. The pressure source 120 may include a pump motor that drives an impeller or other mechanism in a pump (not shown in FIG. 1). The pump maintains a steady pressure in a reservoir (not shown in FIG. 1). A pressure gauge monitors the pressure in the reservoir and, via a feedback path, controls operation of the pump motor to maintain a constant pressure in the reservoir (not shown in FIG. 1).

An output of the pressure source 120 passes through the flow meter 140. In various embodiments, the flow meter 140 includes an electronic mass flow meter. Using an electronic mass flow meter enables electronic monitoring of the pressure flow by the measurement apparatus 190. Also, using an electronic mass flow meter, rather than a mechanical flow meter, provides a more accurate reading of the flow to be able to discern even small changes in flow of gas through the flow lumen 160 into the occluded lobe 182 that may indicate the presence of collateral ventilation out of the occluded lobe 184.

Downstream of the flow meter, the check valve 144 blocks a flow of pressure back from the flow lumen 160. However, to allow the flow generated by the pressure source 120 at a noninjurious level to be conveyed to the lobe 184, in various embodiments, the check valve 144 should have a low opening or cracking pressure. Specifically, the opening or cracking pressure should be less than one-tenth pound per square inch or on the order of hundredths of pounds per square inch. For example, a Qosina™ "High Flow Check Valve" Model 91008 has a cracking pressure of 0.040 pounds per square inch that is well-suited for use in the system 100. The low cracking pressure of the check valve 144 allows the pressure source 120 to be in the nature of a CPAP device. It will be appreciated that such a device can drive a flow of air into the flow lumen 160 at a level which is noninjurious even to a potentially weakened lobe 184 while still providing a seal against backflow from the flow lumen 160.

The flow lumen 160 is connected at the coupling 152. When the flow lumen 160 is integral with the inflation lumen 262 (FIGS. 2A and 2B), both the inflation device 150 and an output of the check valve 144 may be coupled with the flow lumen 150 at the coupling 152.

Figure 8:
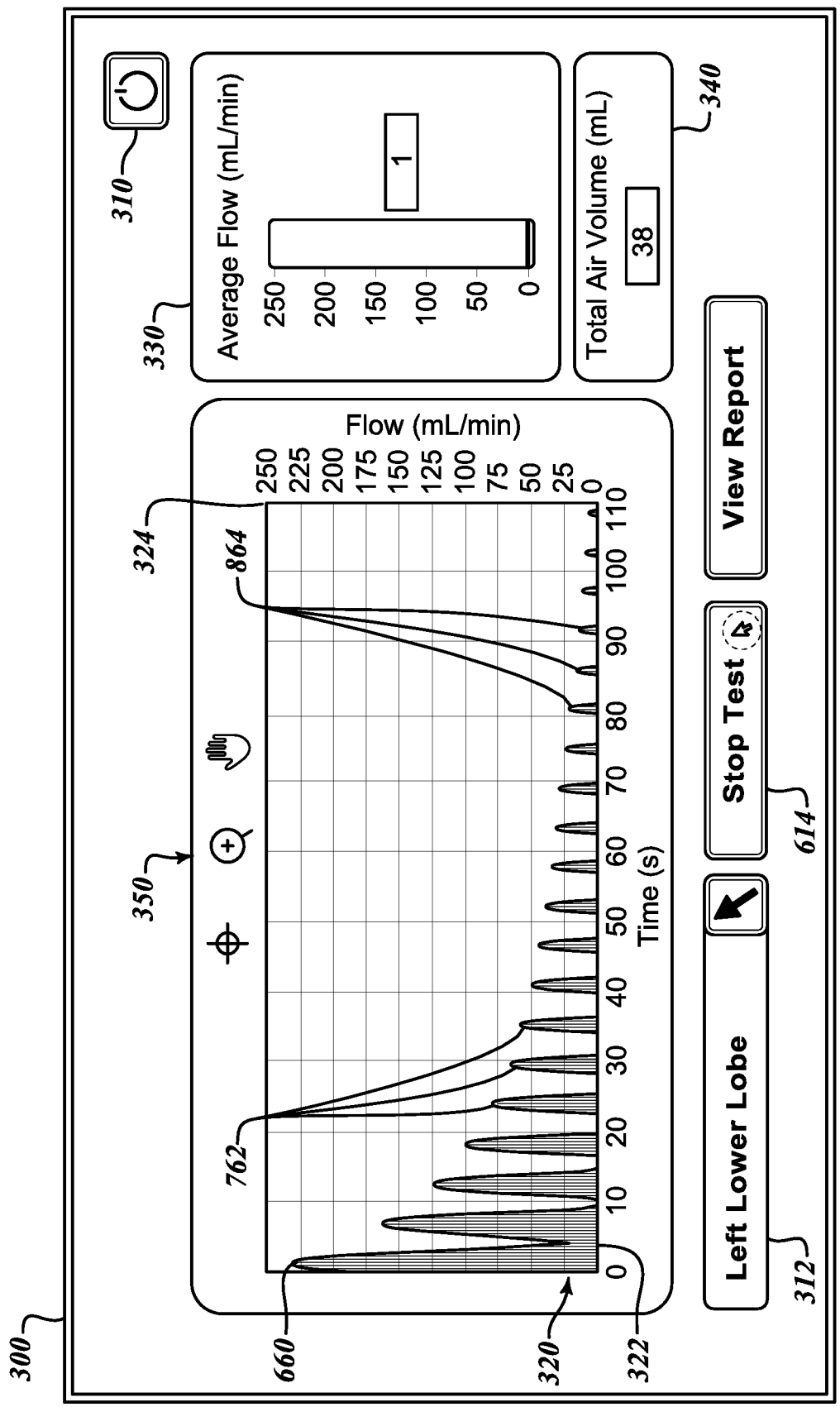
Figure 9:
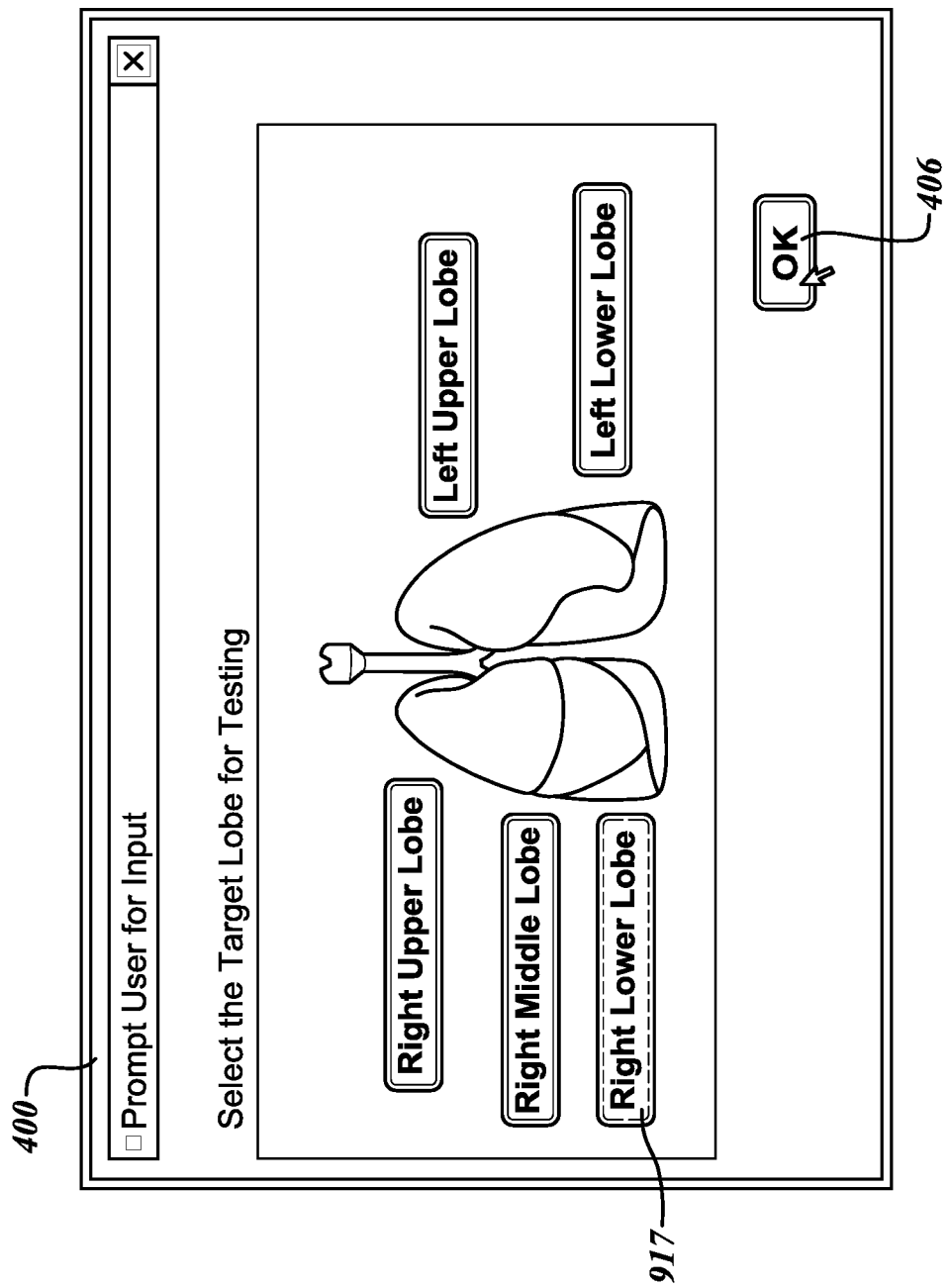
Figure 10:
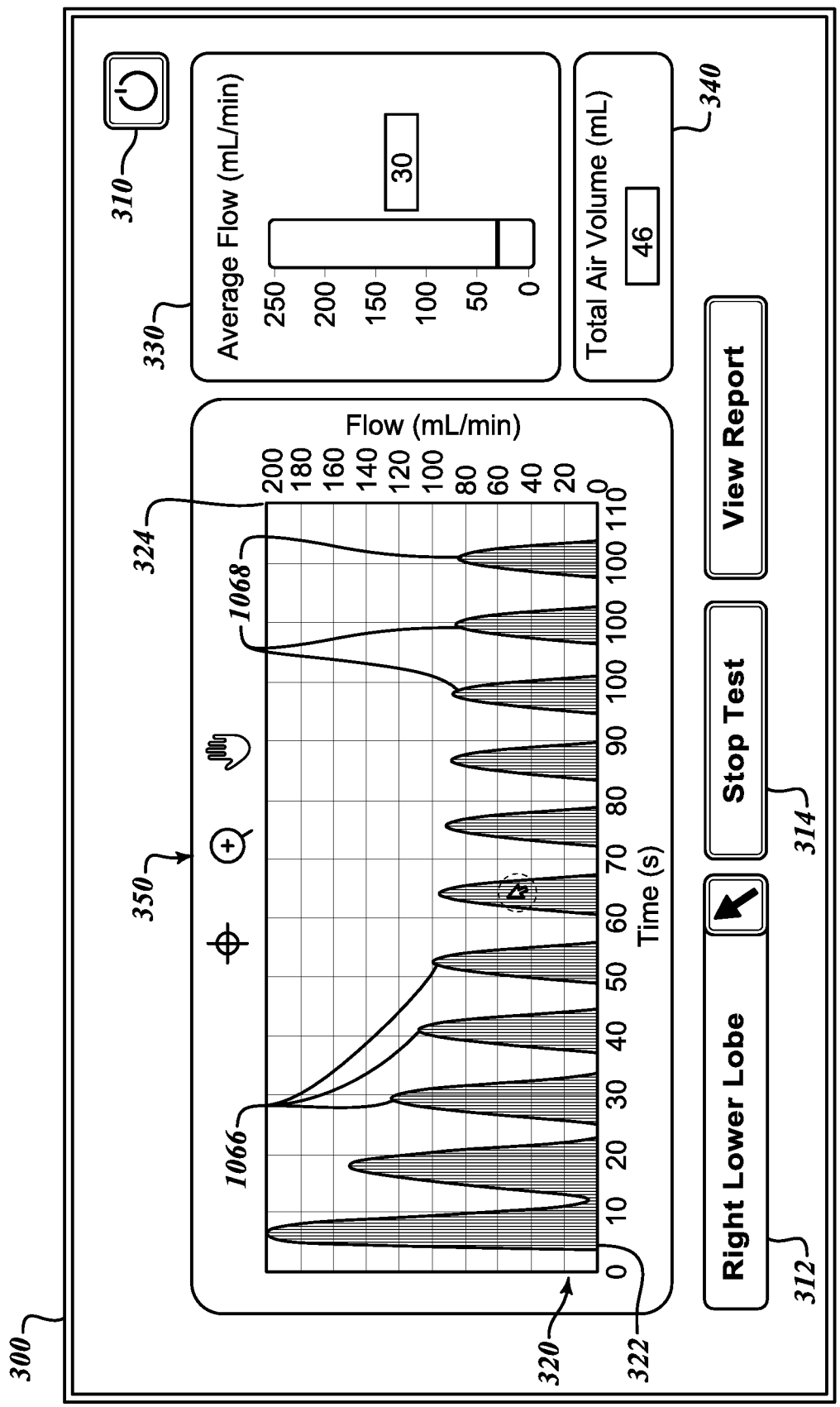
Figure 11:
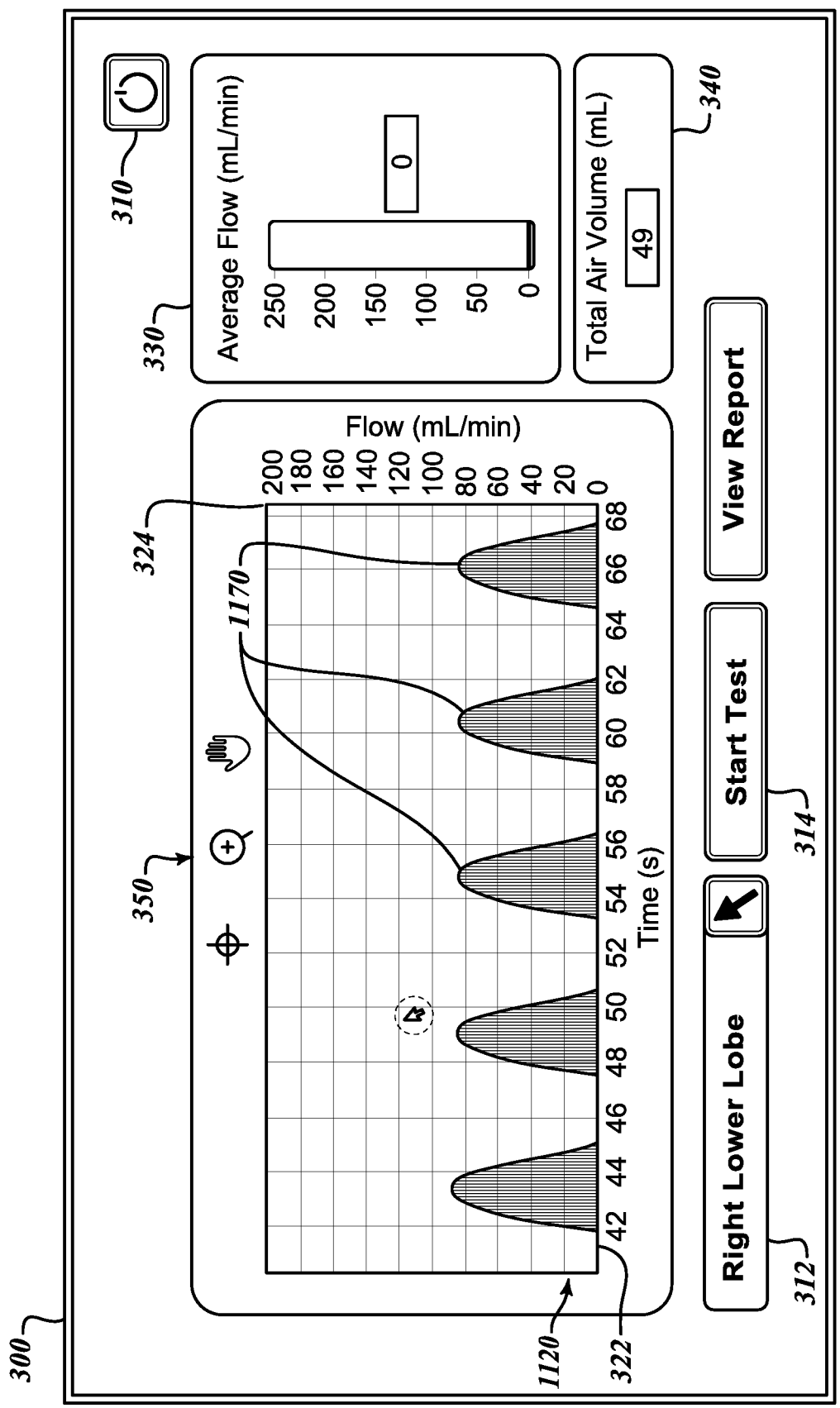

With the lobe 184 occluded by the occlusion device 110 and a pressure prepared to be applied through the flow lumen 160, testing can begin by activating the pressure source 120 and measuring the flow through the flow lumen 160 into the occluded lobe 184 using the flow meter 140. The measured flow may be monitored with the measurement apparatus 190, as described with reference to FIGS. 3-11. FIGS. 3-8 illustrate an example in which the system 100 determines that there is no collateral ventilation from the occluded lobe 184. FIGS. 9-11 illustrate an example in which the system 100 detects that there is collateral ventilation from the occluded lobe 184.

Figure 3:
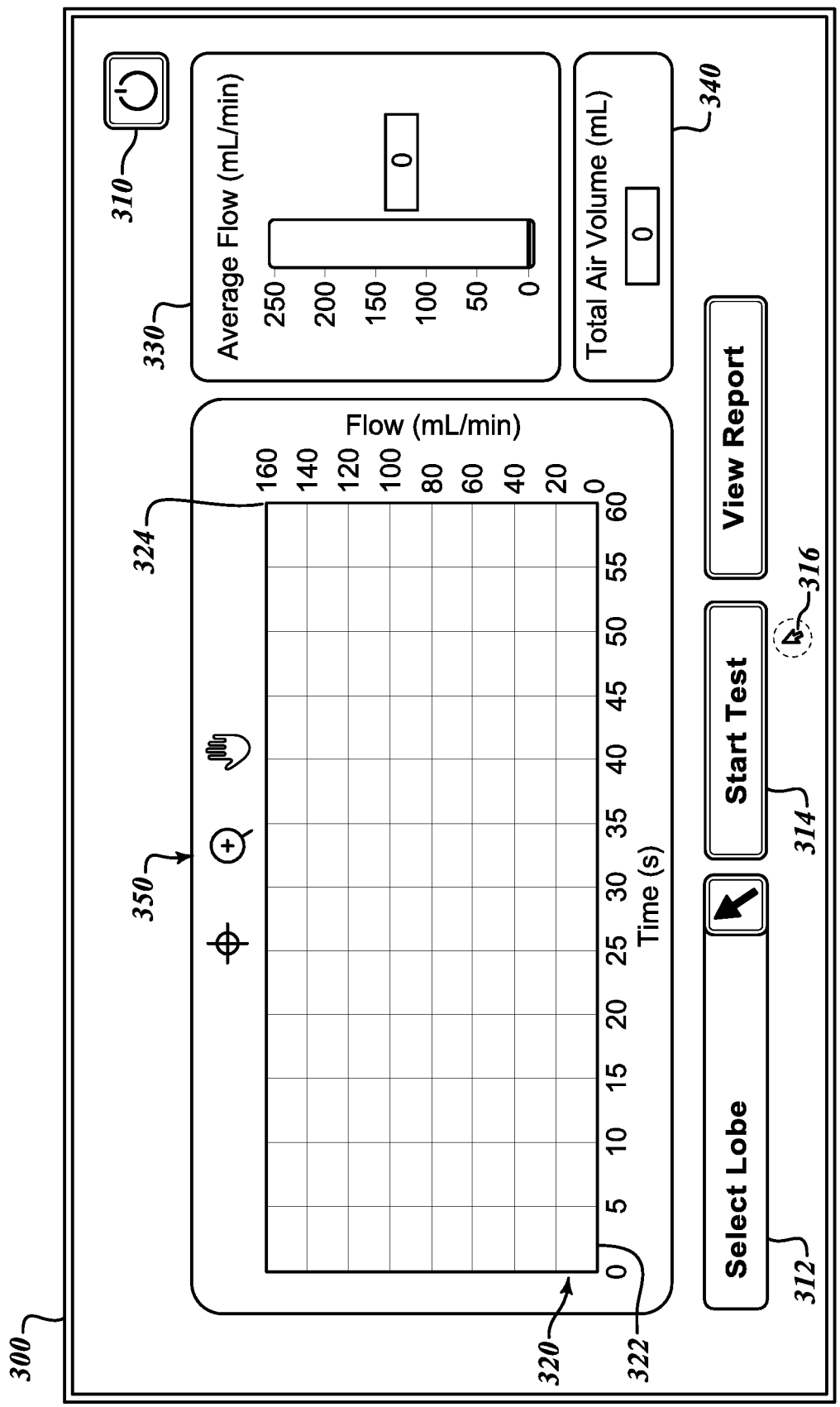
FIGS. 3 through 11 are display screens from an interface in a system for assessing collateral ventilation.

Referring to FIG. 3, at an interface screen 300 in an initial state, a user is provided with a choice of various command options. In various embodiments, the measurement apparatus 190 includes a computing system with a graphical user interface controlled by a mouse, a keyboard, or other input devices. In other embodiments, the measurement apparatus 190 includes a touch-screen. In any case, the interface screen 300 provides user inputs including a power option 310 to turn off the system, a select lobe button 312 to identify the lobe being tested, and a start button 314 to initiate the test. The interface screen 300 also includes a flow display 320 that includes an independent axis 322 to track a time of the test against which is plotted a measured flow plotted on a dependent axis 324. The interface screen 300 also includes an average flow indicator 330 and a total air volume indicator 340. As described below, once the test is commenced, the flow display 320, the average flow indicator 330, and the total air volume indicator 340 present data for these various measurements. The interface screen 300 also includes display controls 350 to enable the user to focus on or magnify portions of the flow display 320 to more closely study the measurements being reported.

Still referring to FIG. 3, a user may engage the select lobe button 312 to identify the lobe where the occlusion device is positioned to isolate the lobe to test it for collateral ventilation. The user may engage the select lobe button 312 by manipulating a cursor 316 that controlled by an input device or, in the case of a touch screen, by touching the select lobe button 312.

Figure 4:
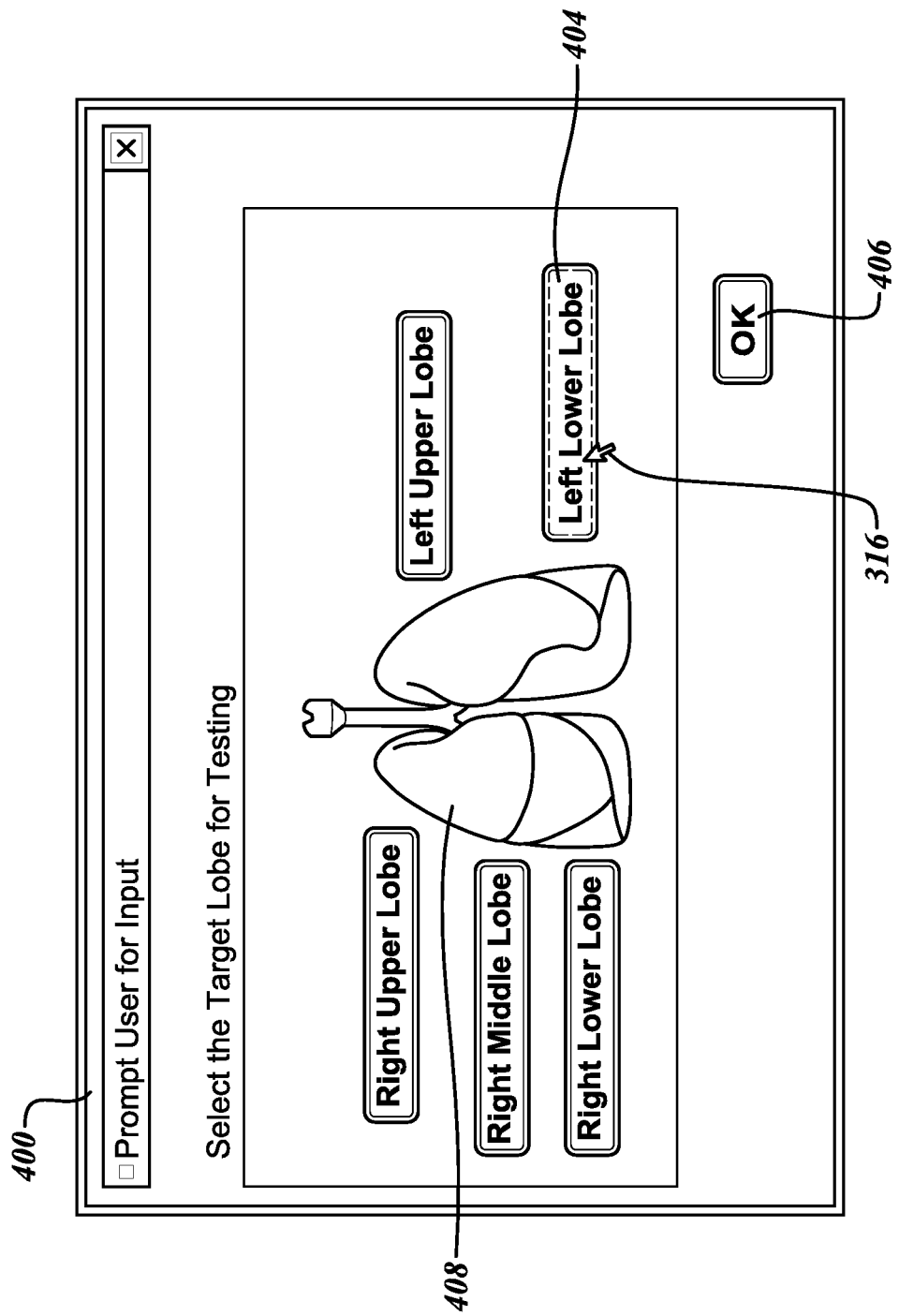

Referring to FIG. 4, upon activating the select lobe button 312 (FIG. 3), the user is presented with a select lobe screen 400. From the select lobe screen 400, the user may identify the lobe being tested by manipulating the cursor 316 to a lobe button 404 that corresponds with the lobe being tested and then selecting an enter or OK button 406 to confirm the selection. Alternatively, the user may identify the lobe being tested by manipulating the cursor 316 to select the lobe to be tested from a lobe map 408.

Figure 5:
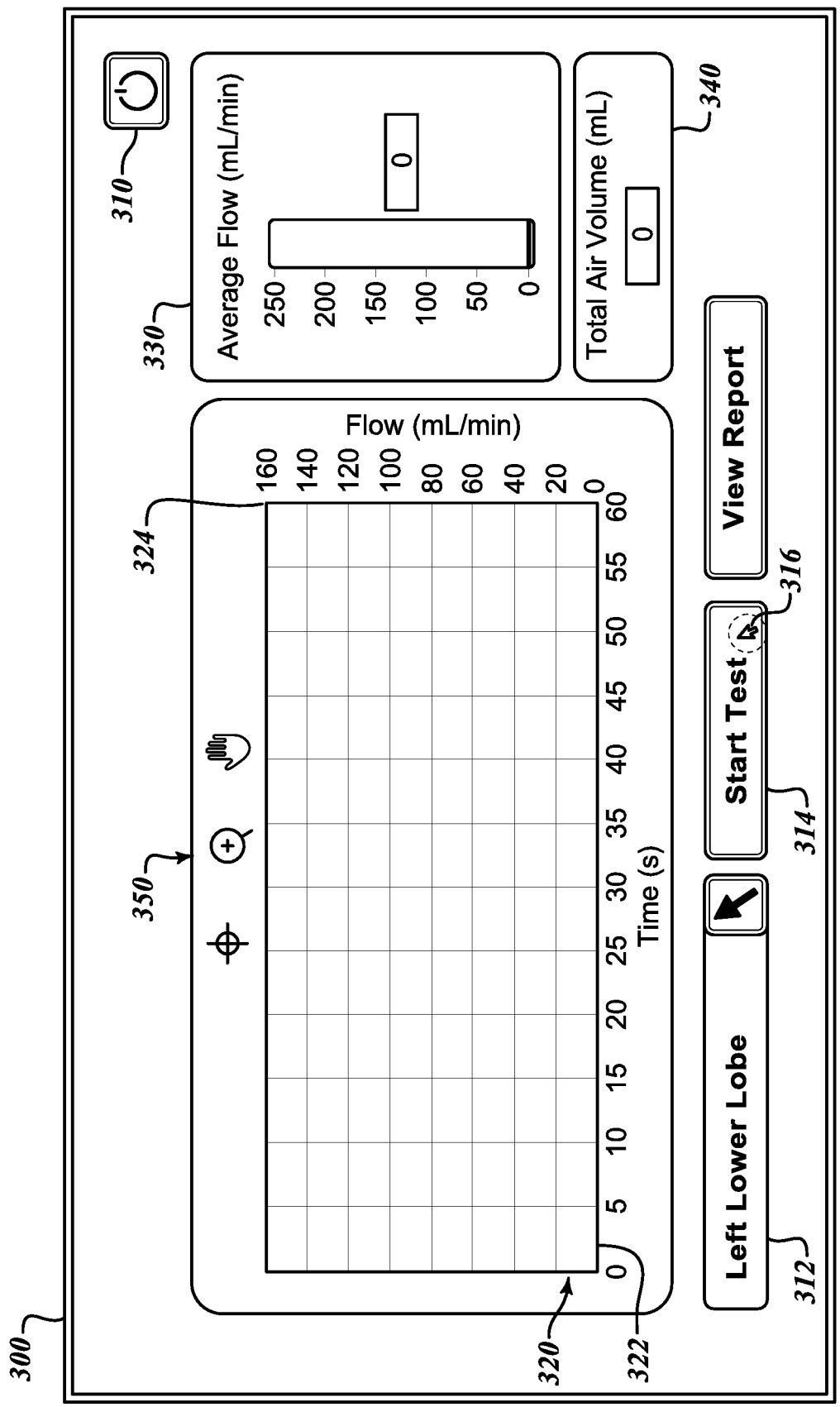

Referring to FIG. 5, after identifying that the "Left Lower Lobe" is to be tested (FIG. 4), the user is returned to the interface screen 300 to initiate the test. To initiate the test, the user may direct the cursor 316 to select the start button 314. Because the test has not yet commenced, it will be appreciated that none of the flow display 320, the average flow indicator 330, or the total air volume indicator 340 shows any flow readings.

Figure 6:
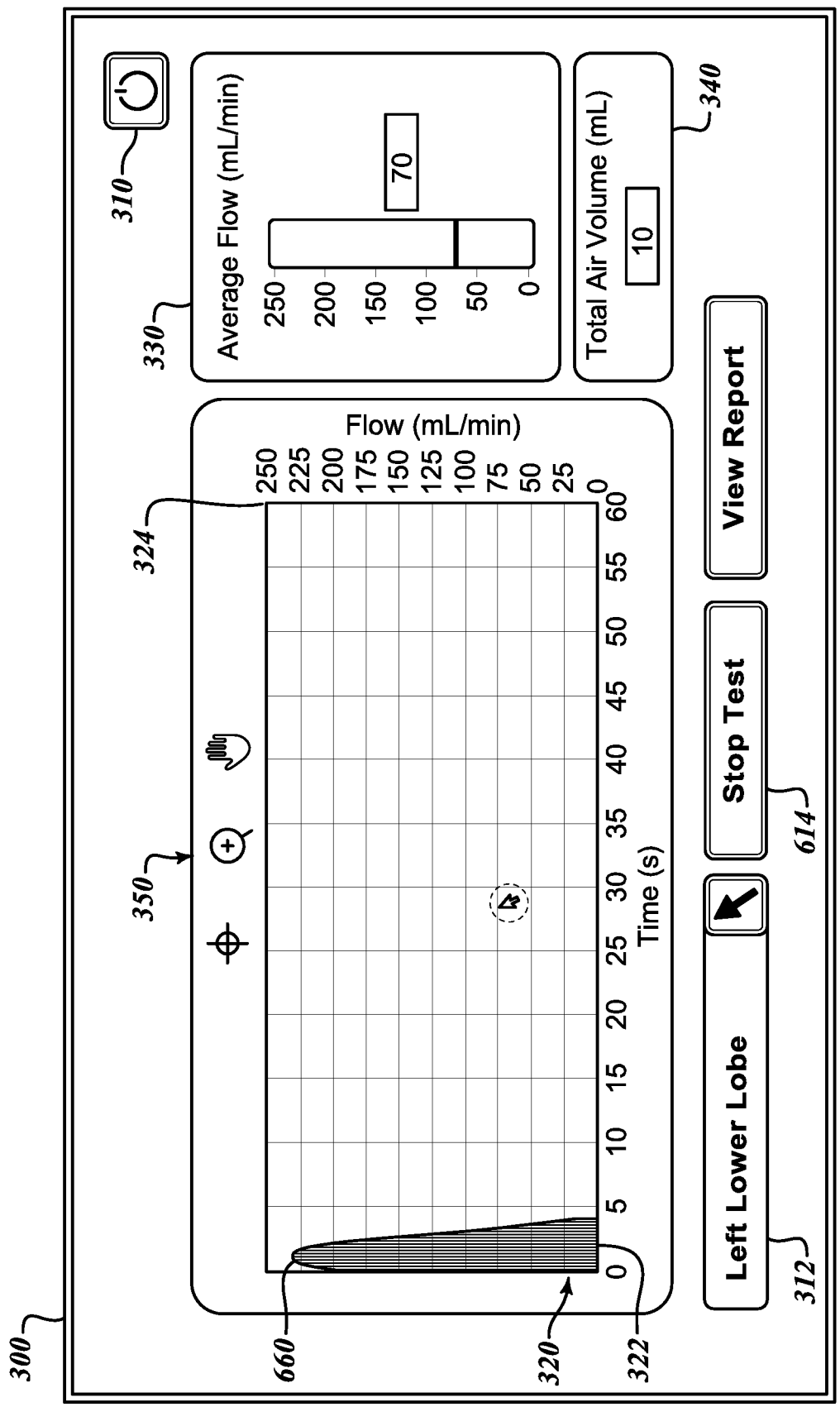

Referring to FIG. 6, the test has commenced. The flow display 320 displays a first curve 660 that shows an initial flow measurement corresponding with a patient's breath. In various embodiments, a scale of the dependent axis 324 that shows the flow is adjusted to fit the first curve. It will be appreciated that, with the commencement of the test and the flow from the pressure source 120 (FIG. 1), the flow may be expected to be at its highest level as the occluded lobe begins to be filled from the flow lumen 160 (FIG. 1) with the least amount of pressure to oppose the flow in the isolated lobe beyond the occlusion device (FIG. 1). The average flow indicator 330 and the total air volume indicators 340 present new values to reflect the measured flow resulting from the commencement of the test. With the commencement of the test, the start button 314 (FIG. 3) has toggled to present a stop button 614 to end the test.

Figure 7:
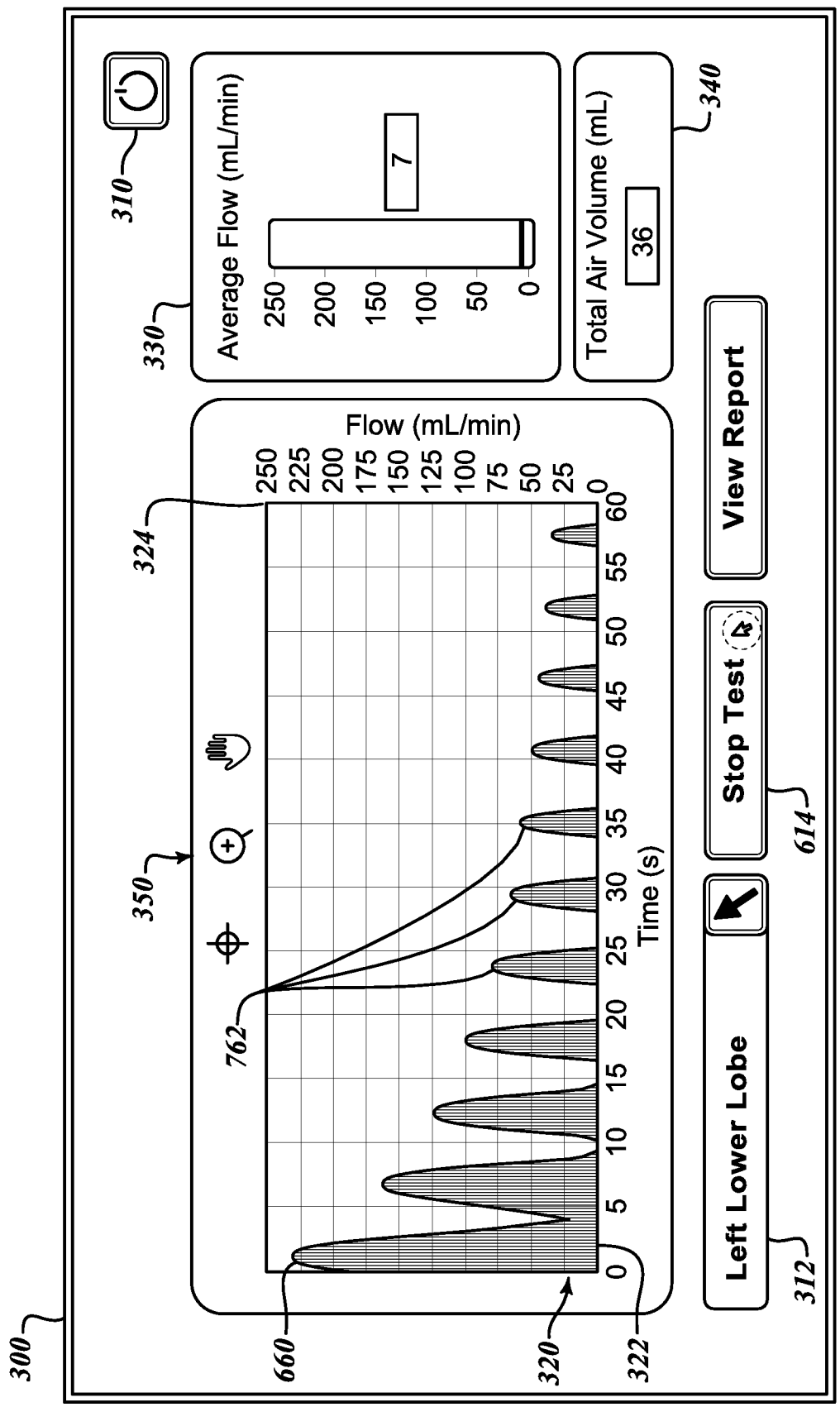

Referring to FIG. 7, after approximately one minute of testing, the flow display 320 presents a first set of additional curves 762 that plot flow versus time. From the first curve 660 through the first set of additional curves 762, it can be seen that the measured flow over time steadily decreases. Although the total air volume indicator 340 understandably reports a rising total volume because the flow has continued over the course of the test, the average flow indicator 330 indicates that the average flow is decreasing, thereby indicating that the occluded lobe is resisting further flow of air from the pressure source 160 (FIG. 1). Referring to FIG. 8, after nearly another minute of testing, the flow display 320 presents a second set of additional curves 864 that shows a further diminution of flow over time. The trend shows that occluded lobe is resisting the continuing flow of air, thereby indicating that pressure is not leaking from the occluded lobe. While the total air volume indicator 340 is further incremented to report the total volume over the course of the test, the average flow indicator 330 indicates that the average flow has further decreased, thereby confirming that the occluded lobe is further resisting any additional flow of air from the pressure source 160 (FIG. 1). Therefore, it can be determined that there is no collateral ventilation from the occluded lobe being tested. At the conclusion of the test, the user may engage the stop test button 614 to end the test.

Referring to FIG. 9, to test another lobe a user proceeds again to the select lobe screen 400 (having again selected the select lobe button 312 as described with reference to FIG. 3). From the select lobe screen 400, the user identifies the lobe to be tested by selecting a corresponding lobe button 917 and then selecting the enter or OK button 406 to confirm the selection.

Referring to FIG. 10, after little more than one minute of testing, the flow display 320 presents additional curves 1066 and 1068 that plot flow versus time. In the first set of curves 1066, the measured flow over time steadily decreases. However, in the second set of curves 1068, the measured flow over time no longer decreases. The average flow indicator 330 also stabilizes to indicate a continuing stable flow. The steady flow indicates a positive collateral ventilation out of the lobe being tested. Referring to FIG. 11, to more closely study selected curves 1170 on the flow display, a user may engage the display controls 350 to show an enlarged portion of the flow display 1120 to verify that the flow is non-decreasing.

Figure 12:
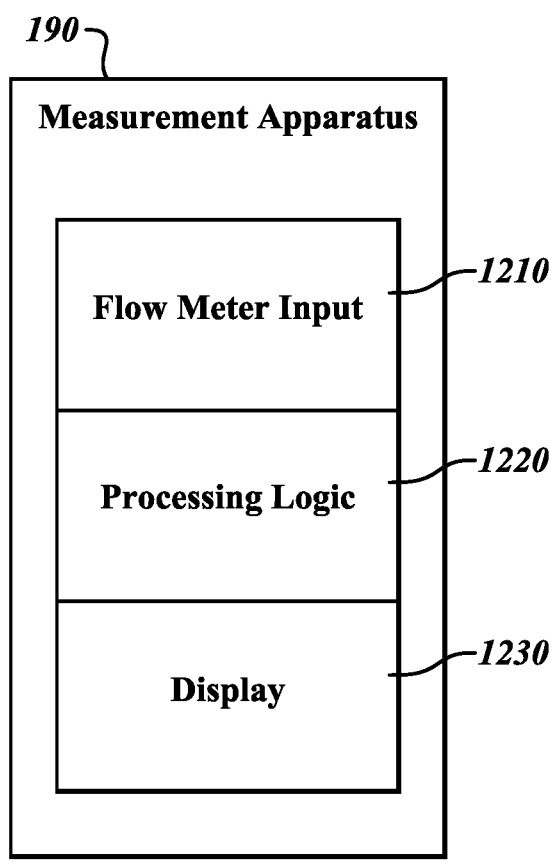
FIG. 12 is a block diagram of an illustrative apparatus for monitoring positive pressure flow into an occluded lobe of a lung.

Referring to FIG. 12, an illustrative embodiment of the measurement apparatus 190 is couplable with the flow meter 140 (not shown in FIG. 12) to monitor positive pressure flow through the flow lumen 160 (not shown in FIG. 12) to determine whether collateral ventilation is occurring from the occluded lobe 182 (not shown in FIG. 12). The measurement apparatus 190 includes a flow meter input 1210, processing logic 1220, and a display 1230. The flow meter input 1210 receives an output of the flow meter 140. As previously described with reference to FIG. 1A, in various embodiments, the flow meter 140 includes an electronic mass flow meter with an electronic output to enable electronic monitoring of the pressure flow by the measurement apparatus 190. The flow meter input 1210 may include analog or digital signal lines configured to receive the output of the flow meter 140. The flow meter input 1210 may include a coupling to receive the output of the flow meter 140 or the flow meter input 121 may be hard-wired to the output of the flow meter 140.

The processing logic 1220 includes an electronic circuit or comparable system that is operably coupled to the flow meter input 1210 to receive data from the flow meter 140 and to the display 1230 to display data to the user indicative of whether collateral ventilation exists in the lobe being tested. The processing logic 1220 may include a computing system as further described with reference to FIG. 13. The processing logic 1220 is operably coupled with the flow meter input 1210 and the display 1230. The processing logic 1220 includes circuitry configured to monitor data received from the flow meter 140 via the flow meter input 1210, process the data, and generate a displayable signal to the display 1230. In various embodiments, the display 1230 includes a device that receives an electronic signal and converts that signal into a graphical representation viewable by a user. Using the display 1230, a user can monitor whether the flow of positive pressure into the occluded lobe of the lung being tested indicates the presence of collateral ventilation, as described with reference to FIGS. 3-11.

Figure 13:
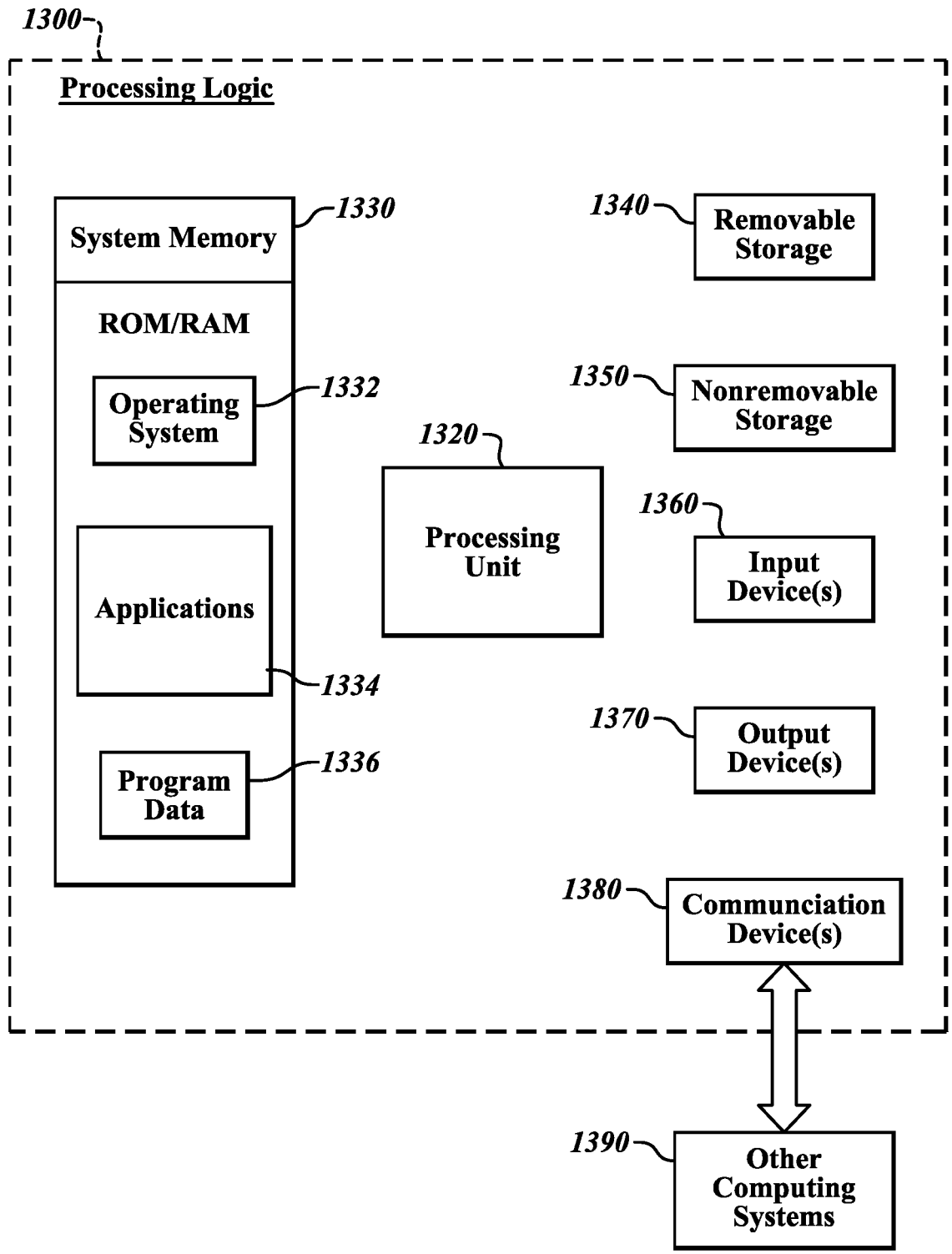
FIG. 13 is a block diagram of an illustrative computing system configurable for use in the apparatus of FIG. 12.

Referring to FIG. 13, the processing logic 1220 (FIG. 12) may include a computing system 1300. The computing system 1300 may include any of a number of forms of stationary or mobile computing devices. The computing system 1300 typically includes at least one processing unit 1320 and a system memory 1330. Depending on the exact configuration and type of computing device, the system memory 1330 may be volatile (such as RAM), non-volatile (such as ROM, flash memory, and the like) or some combination of the two. The system memory 1330 typically maintains an operating system 1332, one or more applications 1334, and program data 1336. The operating system 1332 may include any number of operating systems executable on desktop or portable devices including, but not limited to, Linux, Microsoft Windows, Apple OS, or Android. The one or more applications 1334 include instructions for receiving and processing the flow meter data and generating displayable information, as previously described with reference to FIGS. 3-11.

The computing system 1300 may also have additional features or functionality. For example, the computing system 1300 may also include additional data storage devices (removable and/or non-removable) such as, for example, magnetic disks, optical disks, tape, or flash memory. Such additional storage is illustrated in FIG. 13 by removable storage 1340 and non-removable storage 1350. Computer storage media may include volatile and non-volatile, removable and non-removable media implemented in any method or technology for storage of information, such as computer readable instructions, data structures, program modules or other data. The system memory 1330, the removable storage 1340, and the non-removable storage 1350 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 1330. Any such computer storage media may be part of the computing system 1330.

In various embodiments, the computing system 1330 may also have input device(s) 1360 such as a keyboard, mouse, pen, voice input device, touchscreen input device, etc. Output device(s) 1370 such as a display, speakers, printer, short range transceivers such as a Bluetooth transceiver, etc., may also be included. In various embodiments, the computing system 1330 may include a touch-sensitive display which integrates attributes of an output device 1370 and an input device 1360, enabling a user to interact with information and user-selectable controls presented via the display. Thus, the display 1230 of the measurement apparatus 190 may include a touch-sensitive display enabling a user to control operations of the measurement apparatus 190 and review information presented by the measurement apparatus 190.

The computing system 1300 also may include one or more communication connections 1380 that allow the computing system 1300 to communicate with other computing systems 1390, such as over a wired or wireless network or via Bluetooth (a Bluetooth transceiver may be regarded as an input/output device and a communications connection). The one or more communication connections 1380 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 14:
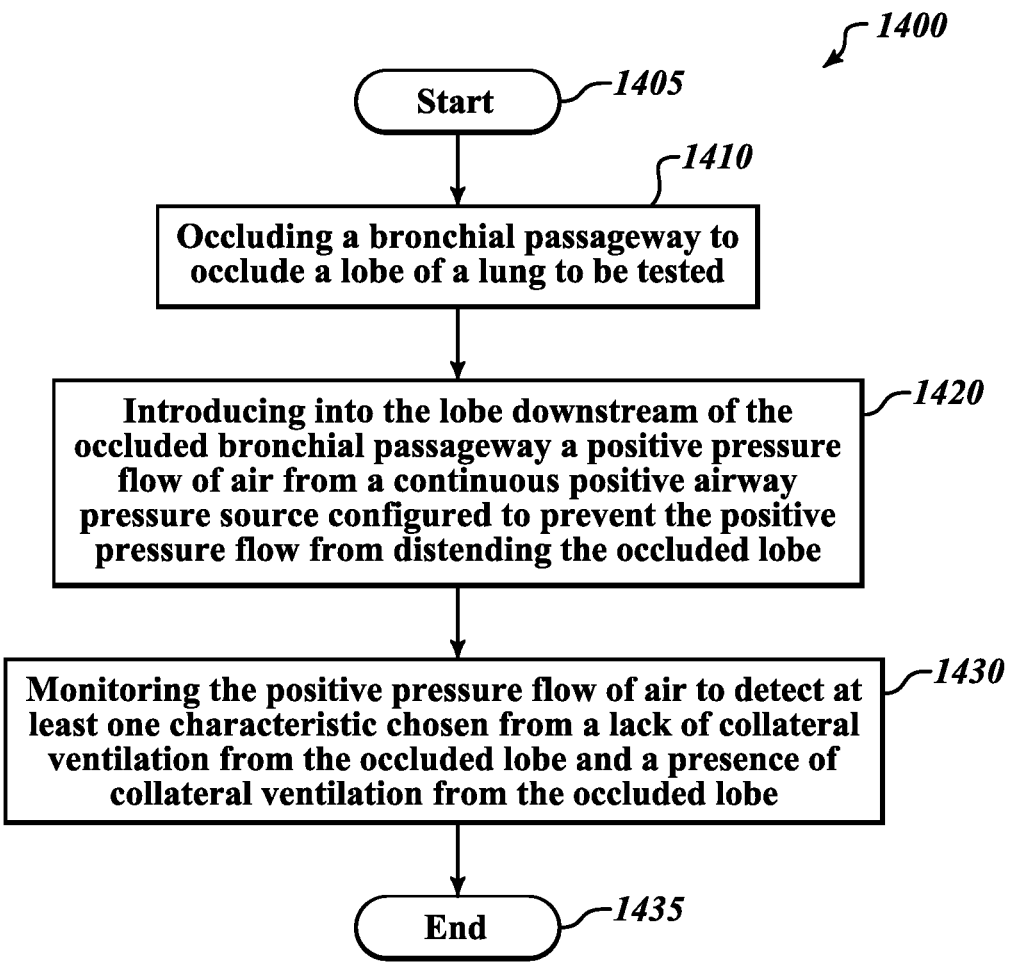
FIG. 14 is a flow diagram of an illustrative method of evaluating measurements from a flow meter positioned to assess potential ventilation from an occluded lobe of a lung.

Referring to FIG. 14, in various embodiments an illustrative method 1400 of testing for collateral ventilation is provided. The method 1400 starts at a block 1405. At a block 1410, a bronchial passageway is occluded to occlude a lobe of a lung as previously described with reference to FIGS. 1A-2. At a block 1420, a positive pressure flow of air from a continuous positive airway pressure source configured to prevent the positive pressure flow from distending the occluded lobe is introduced into the occluded lobe downstream of the occluded bronchial passageway, as also previously described with reference to FIGS. 1A and 1B. At a block 1430, the positive pressure flow of air is monitored to detect at least one characteristic chosen from a lack of collateral ventilation from the occluded lobe and a presence of collateral ventilation from the isolated lobe, as previously described with reference to FIGS. 3-11. The method 1400 ends at a block 1435.

Figure 15:
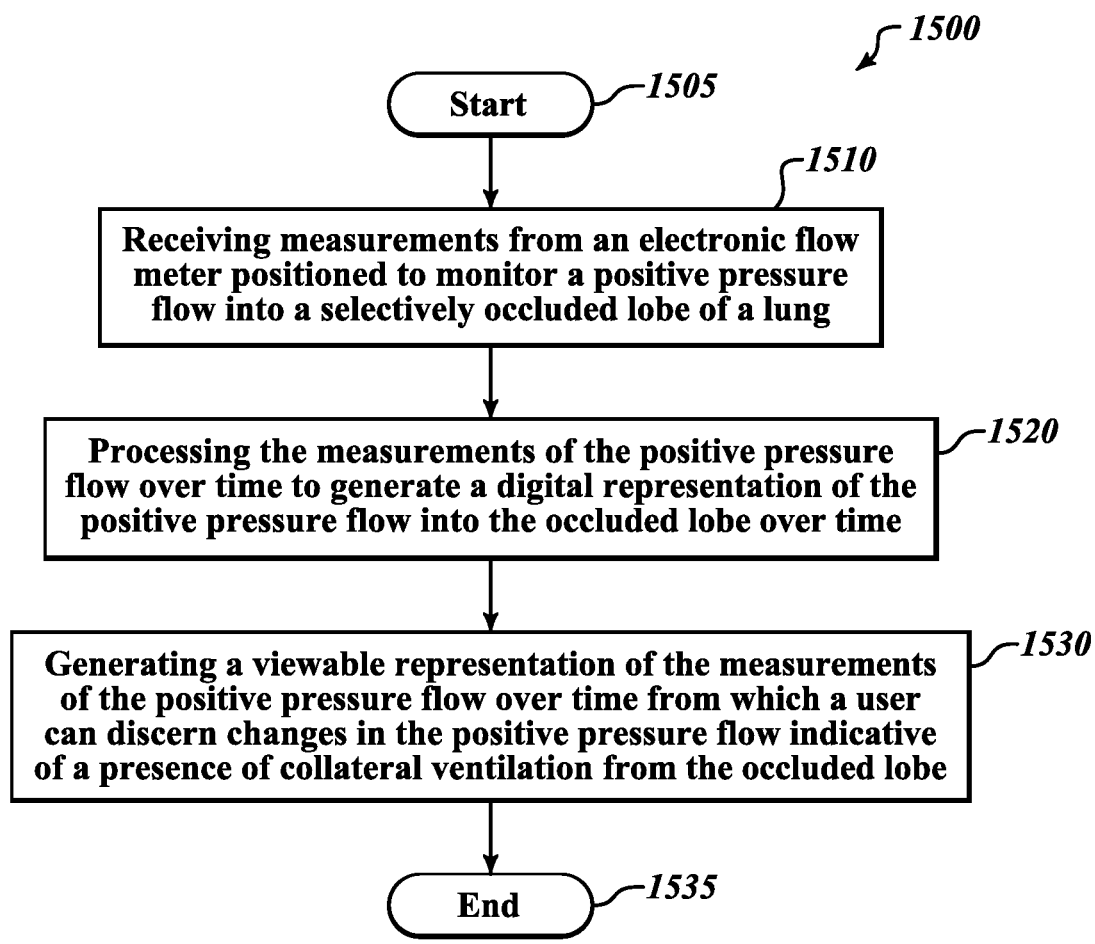
FIG. 15 is a flow diagram of an illustrative method of generating a viewable representation of measurements of a positive pressure flow into an occluded lobe of a lung.

Referring to FIG. 15, in various embodiments an illustrative method 1500 is provided for generating a viewable representation of positive pressure flow into a lobe of a lung to assess possible collateral ventilation. The method 1200 starts at a block 1505. At a block 1510, measurements are received from an electronic flow meter positioned to monitor a positive pressure flow into a selectively occluded lobe of a lung, as previously described with reference to FIGS. 1A and 1B. At a block 1520, the measurements of the positive pressure flow over time are processed to generate a digital representation of the positive pressure flow over time, as previously described with reference to FIGS. 3-13. At a block 1530, a viewable representation of the measurements of the positive pressure flow over time is generated from which a user can discern changes in the positive pressure flow indicative of a presence of collateral ventilation from the lobe, as also previously described with reference to FIGS. 3-13. As previously described, detecting a measurable flow that continues to decrease over time indicates a lack of collateral ventilation from the lobe, while detecting a measurable flow that stabilizes over time may indicate a presence of collateral ventilation. The method 1500 ends at a block 1535.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
    an occlusion device insertable into a bronchial passageway to selectively seal the bronchial passageway to occlude a lobe of a lung to be tested;
    a flow lumen that sealably extends through the occlusion device to a distal end and having a proximal end receptive of a positive pressure flow into the flow lumen, wherein the flow lumen directs the positive pressure flow into the lobe;
    a check valve pneumatically coupleable with the flow lumen to permit the positive pressure flow to pass to the distal end of the flow lumen and to prevent a backflow of pressure from the distal end of the flow lumen; and
    a flow meter pneumatically couplable with the flow lumen to measure the positive pressure flow passing through the flow lumen, the occlusion device being insertable into the bronchial passageway to the occluded lobe and measurements of the flow meter of the positive pressure flow through the flow lumen into the occluded lobe are monitorable to assess a presence of collateral ventilation from the occluded lobe.

2. The apparatus of claim 1, wherein the occlusion device includes a selectively inflatable occlusion device to selectively seal the bronchial passageway.

3. The apparatus of claim 2, further comprising an inflation lumen pneumatically couplable with the selectively inflatable occlusion device to receive a flow of gas to selectively inflate and expand the occlusion device to sealably occlude the bronchial passageway.

4. The apparatus of claim 2, wherein the selectively inflatable occlusion device includes a balloon catheter through which the flow lumen is extendable.

5. The apparatus of claim 1, wherein the positive pressure flow includes a pressure flow in a range of 10 cm $H_2O$ to 15 cm $H_2O$.

6. The apparatus of claim 5, wherein the positive pressure flow includes a pressure flow at 15 cm $H_2O$.

7. The apparatus of claim 1, wherein the positive pressure flow includes a volumetric flow up to 500 mL per minute.

8. The apparatus of claim 1, wherein the flow meter includes an electronic mass flow meter.

9. The apparatus of claim 1, wherein the check valve has a cracking pressure of less than one-tenth pound per square inch.

10. The apparatus of claim 9, wherein the check valve has a cracking pressure of fewer than fifty-hundredths pounds per square inch.

11. A system comprising:
an occlusion device insertable into a bronchial passageway to selectively seal the bronchial passageway to occlude a lobe of a lung to be tested;
a flow lumen that sealably extends through the occlusion device to a distal end and having a proximal end receptive of a positive pressure flow into the flow lumen, wherein the flow lumen directs the positive pressure flow into the lobe;
a pressure source pneumatically couplable to the proximal end of the flow lumen to provide the positive pressure flow;
a check valve pneumatically coupleable with the flow lumen to permit the positive pressure flow to pass to the distal end of the flow lumen and to prevent a backflow of pressure from the distal end of the flow lumen;
a flow meter pneumatically couplable with the flow lumen to measure the positive pressure flow passing through the flow lumen and into the lobe; and
a measurement apparatus communicatively couplable with the flow meter to monitor the positive pressure flow to the occluded lobe over time to assess presence of collateral ventilation out of the occluded lobe.

12. The system of claim 11, wherein the occlusion device includes a selectively inflatable occlusion device to selectively seal the bronchial passageway and an inflation lumen pneumatically couplable with the selectively inflatable occlusion device to receive a flow of gas to selectively inflate and expand the occlusion device to sealably occlude the bronchial passageway.

13. The system of claim 12, wherein the occlusion device includes a balloon catheter through which the flow lumen is extendable.

14. The system of claim 11, wherein the pressure source includes a continuous positive airway pressure pump.

15. The system of claim 11, wherein the pressure source is configured to provide the positive pressure flow in a range of 10 cm $H_2O$ to 15 cm $H_2O$ and a volumetric flow rate up to 500 mL per minute.

16. The system of claim 11, wherein the flow meter includes an electronic mass flow meter.

17. The system of claim 11, wherein the check valve has a cracking pressure of less than one-tenth pound per square inch.

18. The system of claim 11, wherein the check valve has a cracking pressure of fewer than fifty-hundredths pounds per square inch.

19. A method comprising:
occluding a bronchial passageway to occlude a lobe of a lung to be tested;
introducing into the occluded lobe downstream of the occluded bronchial passageway a positive pressure flow of air from a continuous positive airway pressure source configured to prevent the positive pressure flow from distending the isolated lobe; and
monitoring the positive pressure flow of air into the occluded lobe to detect at least one characteristic chosen from a lack of collateral ventilation from the occluded lobe and a presence of collateral ventilation from the occluded lobe.

20. The method of claim 19, wherein:
a continual decrease over time of the positive pressure flow into the occluded lobe indicates a lack of collateral ventilation from the occluded lobe; and
a continuation over time of the positive pressure flow into the occluded lobe indicates a presence of collateral ventilation from the occluded lobe.

* * * * *